United States Patent
Simonsen et al.

(10) Patent No.: US 9,803,621 B2
(45) Date of Patent: Oct. 31, 2017

(54) WIND TURBINE CONTROL

(71) Applicant: VESTAS WIND SYSTEMS A/S, Aarhus N (DK)

(72) Inventors: Kenneth Tougaard Simonsen, Hadsten (DK); Paw Rosenvard, Gjern (DK); David Steele, Lystrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 280 days.

(21) Appl. No.: 14/404,129

(22) PCT Filed: Jun. 6, 2013

(86) PCT No.: PCT/DK2013/050173
§ 371 (c)(1),
(2) Date: Nov. 26, 2014

(87) PCT Pub. No.: WO2013/182201
PCT Pub. Date: Dec. 12, 2013

(65) Prior Publication Data
US 2015/0139797 A1    May 21, 2015

Related U.S. Application Data

(60) Provisional application No. 61/657,048, filed on Jun. 8, 2012.

(51) Int. Cl.
F03D 7/02    (2006.01)
F03D 7/04    (2006.01)

(52) U.S. Cl.
CPC ......... *F03D 7/0296* (2013.01); *F03D 7/0212* (2013.01); *F03D 7/0224* (2013.01);
(Continued)

(58) Field of Classification Search
CPC .... F03D 7/0296; F03D 7/0212; F03D 7/0224; F03D 7/0264; F03D 7/0268; F03D 7/047
(Continued)

(56) References Cited

U.S. PATENT DOCUMENTS 4,408,954 A * 10/1983 Earle ............... F03D 7/0212
                                                    416/132 B
8,162,608 B2 * 4/2012 Birkemose ......... F03D 7/0204
                                                    416/1
(Continued)

FOREIGN PATENT DOCUMENTS

EP    2003335 A2    12/2008
EP    2306005 A2    4/2011
(Continued)

OTHER PUBLICATIONS

International Search Report for PCT/DK2013/050173, Sep. 13, 2013.

*Primary Examiner* — Dwayne J White
*Assistant Examiner* — Aaron R Eastman
(74) *Attorney, Agent, or Firm* — Patterson + Sheridan, LLP

(57) ABSTRACT

The present invention relates to methods, apparatus and computer program products for controlling a wind turbine that comprises a nacelle and one or more turbine blades to reduce or prevent edgewise vibrations building up on the one or more turbine blades. It is identified 202 whether the nacelle is unable to yaw to an upwind position and initiating a corrective action 203 to prevent edgewise vibrations building up on the one or more turbine blades if the nacelle is unable to yaw to an upwind position.

9 Claims, 2 Drawing Sheets

(52) U.S. Cl.
CPC ......... *F03D 7/0264* (2013.01); *F03D 7/0268* (2013.01); *F03D 7/047* (2013.01); *Y02E 10/723* (2013.01)

(58) Field of Classification Search
USPC ........................................................ 415/119
See application file for complete search history.

(56) References Cited

U.S. PATENT DOCUMENTS

| | | | | |
|---|---|---|---|---|
| 8,353,667 | B2* | 1/2013 | Hoffmann | F03D 7/0204 416/37 |
| 9,303,626 | B2* | 4/2016 | Kumar | F03D 7/0224 |
| 2009/0045627 | A1* | 2/2009 | Cairo | F03D 7/0224 290/44 |
| 2009/0068013 | A1* | 3/2009 | Birkemose | F03D 7/0204 416/31 |

FOREIGN PATENT DOCUMENTS

| | | |
|---|---|---|
| WO | 2009/068036 A2 | 6/2009 |
| WO | 2011/035788 A2 | 3/2011 |

\* cited by examiner

WIND TURBINE CONTROL

The present invention relates to wind turbine control and, in particular, to wind turbine control to prevent edgewise vibrations from building up on wind turbine blades.

A wind turbine known in the art comprises a tapered wind turbine tower and a wind turbine nacelle positioned on top of the tower. A number of wind turbine blades are connected to the nacelle via a rotor, hub and drive shaft.

Edgewise vibrations of wind turbine blades can lead to significant damage of the turbine blades due to high-cycle fatigue. The damage caused by the edgewise vibrations can require frequent repairs of the turbine blades and, ultimately, lead to reduced blade life time, as well as increasing the downtime of the wind turbine for repairs or replacements which thereby negatively impacts the annual energy production. Wind turbines are often erected in remote and hostile environments where repairing or replacing a blade can also be very difficult and extremely costly.

Wind turbine blades are often protected until commissioning by a surface mounted device on the blade that can reduce the risk of edgewise vibrations on the turbine blades. However, once the wind turbine is commissioned the surface mounted device is removed and the problem of edgewise vibrations may occur.

After commissioning the wind turbine, one mechanism to avoid edgewise vibration is to maintain and position the nacelle/rotor upwind, in other words into the wind direction. However, it is not always possible to keep the nacelle/rotor positioned upwind, for example, during servicing of the wind turbine where the wind turbine nacelle may be required to be positioned away from the wind for an extended period of time, if the yaw system of the wind turbine is disabled/faulty, or if a defective wind sensor cannot determine the upwind direction for the wind turbine.

Accordingly, there is a need to prevent or substantially eliminate edgewise vibrations on the wind turbine blades where the nacelle of the wind turbine cannot be positioned upwind.

The present invention seeks to address, at least in part, some or all of the problems and needs described hereinabove.

According to a first aspect of the present invention there is provided a method for controlling a wind turbine comprising a nacelle and one or more turbine blades wherein the method comprises the steps of: identifying the nacelle is unable to yaw to an upwind position; and initiating a corrective action to prevent edgewise vibrations building up on the one or more turbine blades if the nacelle is unable to yaw to an upwind position.

Accordingly, the present invention advantageously identifies that the nacelle is unable to yaw to an upwind position and then initiates a corrective action to prevent the buildup of damaging edgewise vibrations on one or more turbine blades. The upwind position of the nacelle is where the nacelle, and therefore the turbine blades, faces the wind direction. The method may be implemented by a controller in the wind turbine. The method may be implemented in software, hardware or any combination thereof.

The method may further comprise the step of determining if the nacelle can yaw and initiating the corrective action based on the determination of whether the nacelle can yaw. Accordingly, it may be determined whether the nacelle is able to yaw, in other words the nacelle may not be able to yaw to the upwind position due to, for example, being unable to determine or identify the upwind direction, under a service or maintenance operation, due to safety reasons, and so on, but may still be able to yaw. The corrective action to initiate may then be based on the determination of whether the nacelle is able to yaw.

The step of initiating the corrective action may further comprise the step of instructing the nacelle to continuously yaw at low speed. Accordingly, one corrective action that may be initiated in order to prevent edgewise vibrations from building up on the one or more turbine blades may be to continuously yaw, at low speed, the nacelle of the wind turbine.

The step of instructing the nacelle to continuously yaw at low speed may further comprise the step of instructing the nacelle to yaw 45 degrees counter-clockwise and then to yaw 45 degrees clockwise. Accordingly, the nacelle may be instructed to continuously yaw between 45 degrees counter-clockwise and 45 degrees clockwise. However, as will be appreciated, the nacelle may be instructed to yaw between any suitable angles for the purpose of preventing the build-up of damaging edgewise vibrations on the turbine blades.

The step of initiating the corrective action may further comprise the step of instructing the one or more turbine blades to continuously at low speed change pitch angle. Another corrective action that may be initiated may be to continuously and at low speed, change the pitch angle of one or more turbine blades. This corrective action is particularly advantageous if the nacelle is unable to yaw, for example during service or maintenance operations but may be initiated even if the nacelle is able to yaw. The method may identify or determine which of the one or more turbine blades to continuously change the pitch angle. For example, if one of the turbine blades is undergoing a service or maintenance operation then, for safety or maintenance reasons, that turbine blade may not be able or permitted to change the pitch angle and therefore the method may determine or identify which of the one or more turbine blades that may have the corrective action applied.

The step of instructing the one or more turbine blades to continuously at low speed change pitch angle may further comprise the step of instructing the one or more turbines to change pitch angle between 90 degrees and 70 degrees. Therefore, the pitch angle of the turbine blades may be continuously and at low speed changed between 90 degrees and 70 degrees. However, as will be appreciated, the one or more turbine blades may be instructed to pitch between any suitable angles for the purpose of preventing the build-up of damaging edgewise vibrations on the turbine blades.

The one or more turbine blades may be instructed to change pitch angle in a synchronized manner (e.g. the turbine blades move between 90 degrees and 70 degrees simultaneously) or the one or more turbine blades may be instructed to change pitch angle in an out of synchronized manner (e.g. one turbine blade moves between 90 degrees and 70 degrees and another turbine blades moves between 70 degrees and 90 degree simultaneously).

According to a second aspect there is provided a wind turbine comprising: a nacelle; one or more turbine blades; a first processor adapted to identify the nacelle is unable to yaw to an upwind position; and a second processor adapted to initiate a corrective action to prevent edgewise vibrations building up on the one or more turbine blades if the nacelle is unable to yaw to an upwind position.

According to a third aspect of the present invention there is provided a wind turbine comprising a nacelle and one or more turbine blades being adapted to or comprising means for: identifying the nacelle is unable to yaw to an upwind position; and initiating a corrective action to prevent edgewise vibrations building up on the one or more turbine blades if the nacelle is unable to yaw to an upwind position.

The wind turbine may further comprise a third processor adapted to determine if the nacelle can yaw and the second processor is further adapted to initiate the corrective action based on the determination of whether the nacelle can yaw.

The second processor may be further adapted to instruct the nacelle to continuously yaw at low speed.

The second processor may be further adapted to instruct the nacelle to yaw 45 degrees counter-clockwise and then to yaw 45 degrees clockwise. However, as will be appreciated, the nacelle may be instructed to yaw between any suitable angles for the purpose of preventing the build-up of damaging edgewise vibrations on the turbine blades.

The second processor may be further adapted to instruct the one or more turbine blades to continuously at low speed change pitch angle.

The second processor may be further adapted to instruct the one or more turbines to change pitch angle between 90 degrees and 70 degrees. However, as will be appreciated, the one or more turbine blades may be instructed to pitch between any suitable angles for the purpose of preventing the build-up of damaging edgewise vibrations on the turbine blades.

The second processor may be further adapted to instruct the one or more turbine blades to change pitch angle in a synchronized manner (e.g. the turbine blades move between 90 degrees and 70 degrees simultaneously) or in an out of synchronized manner (e.g. one turbine blade moves between 90 degrees and 70 degrees and another turbine blades moves between 70 degrees and 90 degree simultaneously).

The first processor, second processor, and third processor may be the same processor, different processors or any combination thereof. The wind turbine may be adapted by software, hardware or any combination thereof. The wind turbine may comprise any means, or be adapted to, implement any or all of the features or functions of the method of the present invention.

According to a fourth aspect of the present invention there is provided a computer program product comprising computer readable executable code for: identifying the nacelle is unable to yaw to an upwind position; and initiating a corrective action to prevent edgewise vibrations building up on the one or more turbine blades if the nacelle is unable to yaw to an upwind position.

The computer program product may comprise any computer readable executable code for implementing any or all of the features of functions of the present invention.

Embodiments of the present invention will now be described, by way of example only, and with reference to the accompanying drawings, in which.

Figure 1:
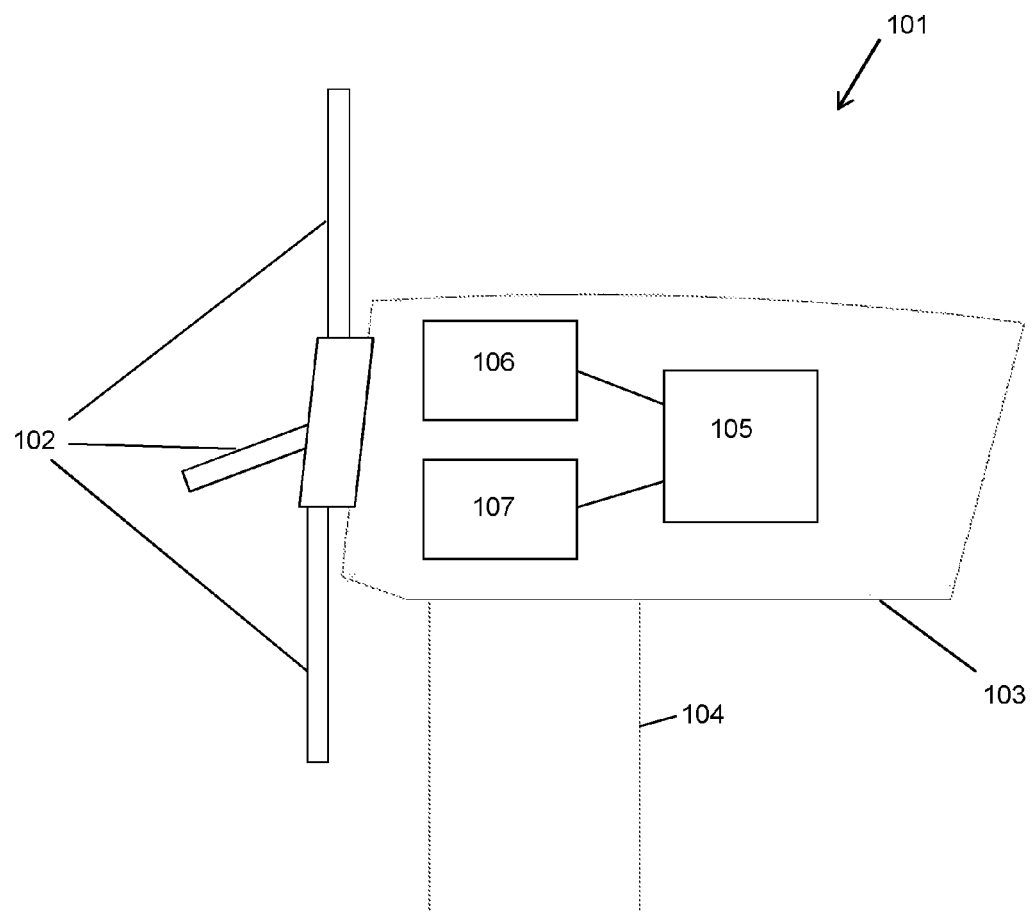
FIG. 1 shows a simple schematic of wind turbine according to many of the embodiments of the present invention.

With reference to FIG. 1, a wind turbine 101 typically comprises turbine blades 102 coupled to a nacelle 103, which in turn is typically mounted on a tower 104.

In FIG. 1, three turbine blades 102 are shown however, as will be appreciated, the number of turbine blades 102 is dependent on the design of the wind turbine and may include one or more turbine blades 102.

Also, FIG. 1 shows a horizontal axis turbine blade arrangement however, as will be appreciated, the wind turbine may alternatively or additionally include a vertical axis turbine blade arrangement.

The nacelle 103 will typically house a wind turbine controller 105 for controlling the wind turbine, a pitch control system 106, for controlling the pitch of the turbine blades 102, and a yaw control system 107, for controlling the yaw, or direction, of the nacelle 103.

Typically, the nacelle 103 will also house the wind turbine's 101 electrical generator, gearbox, drive shafts, and other electrical and mechanical equipment, which are not shown in FIG. 1 for ease of reference.

As described hereinabove, edgewise vibrations can cause significant problems for wind turbines 101. Typically, to reduce the edgewise vibrations on the turbine blades 102 the conventional wind turbines 101, via the controller 105 and the yaw control system 107, yaw the nacelle 103 such that the nacelle 103, and therefore the turbine blades, are positioned in the upwind direction.

However, in certain circumstances or situations the nacelle 103 is unable to yaw upwind and as such the turbine blades 102 will be subject to edgewise vibrations which may cause fatigue and damage to the turbine blades 102.

For example, one or more defective sensors, e.g. a wind sensor such as an anemometer sensor, Light Detecting and Ranging (LiDAR) device, may prevent the wind turbine controller 105 from being able to determine the upwind direction and thus will be unable to yaw the nacelle 103 into an upwind position.

In another example, during service operations on the yaw system of the wind turbine 101 it will not be possible to position the nacelle 103 upwind or change the yaw position of the nacelle 103 to maintain an upwind direction.

In further examples, during various service operations, e.g. during blade repair, gearbox repair, and so on, the nacelle 103 of the wind turbine 101 may also not be able to be positioned upwind or may be required to be positioned away from the upwind direction and kept there for an extended time. During various service operations equipment such as a crane may be needed, which can also prevent the nacelle 103 from yawing to a position that is upwind.

In all these circumstances and situations the turbine blades 102 may be subject to edgewise vibrations which will damage or reduce the lifetime of the turbine blades 102.

As will be appreciated by a person skilled in the art, there are several service operations, maintenance operations or safety operations (e.g. a shutdown due to conditions affecting the wind turbine), other than those listed above as examples, during which the nacelle will be unable to be positioned upwind.

Figure 2:
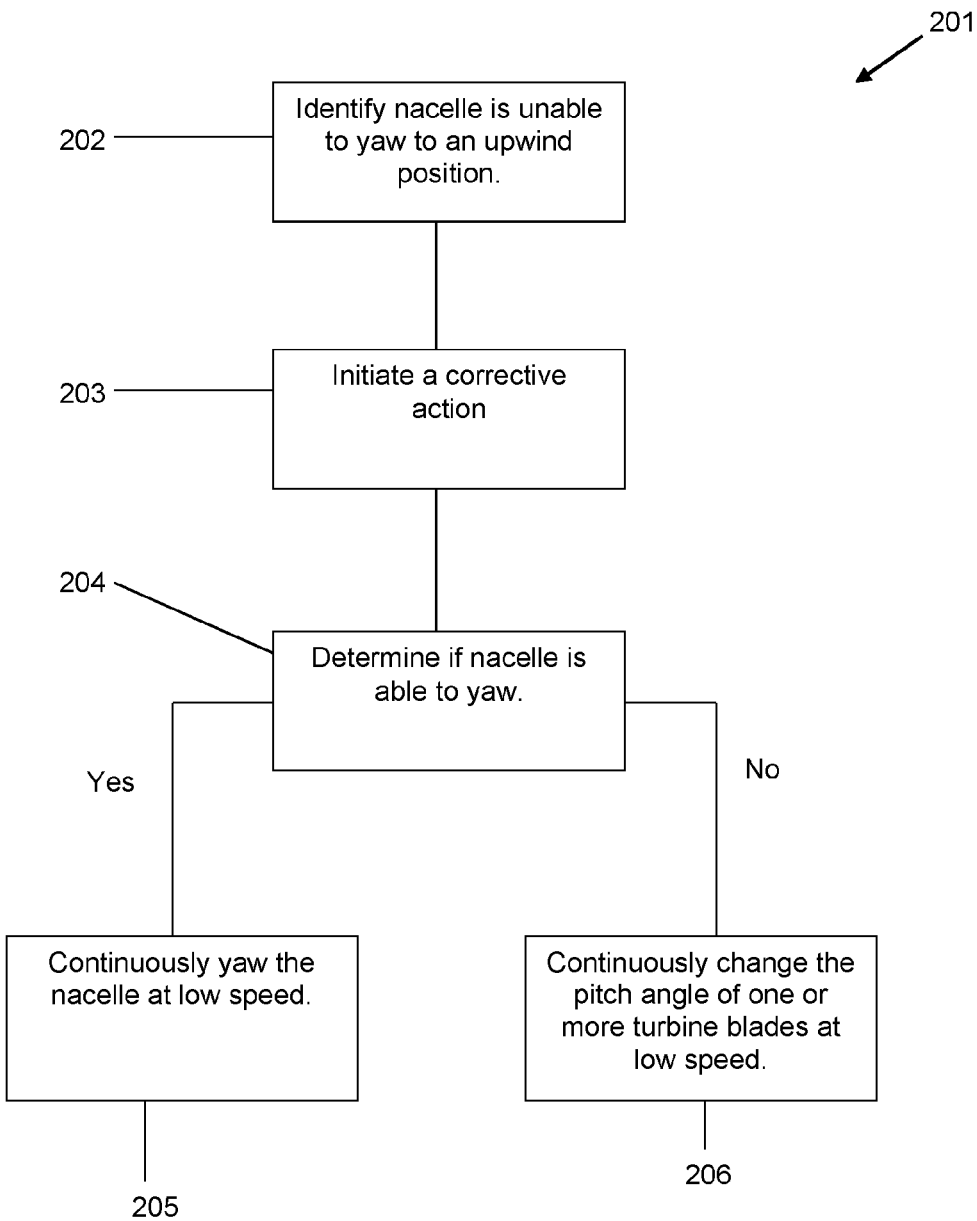
FIG. 2 shows a flow chart according to many of the embodiments of the present invention.

With reference to FIG. 2, which shows a flow chart 201 according to embodiments of the present invention, in step 202 the controller of the wind turbine determines or identifies that the nacelle cannot be moved or yawed to an upwind position.

In step 203, the controller identifies that a corrective action should be performed in order to prevent edgewise vibrations from damaging the turbine blades.

In step 204, the controller determines whether the nacelle is able to yaw. For example, the nacelle may be able to yaw if a defective wind sensor is identified such that the controller is unable to detect the upwind direction and thus position the nacelle upwind. However, as will be appreciated there may be other circumstances in which the nacelle is able to yaw but the wind turbine controller is unable to yaw the nacelle into an upwind position.

In this case the controller determines that the nacelle is able to yaw and as such initiates, in step 205 as a corrective action, the yaw control system to substantially continuously and at low speed yaw the nacelle of the wind turbine. For example, the controller may instruct the yaw system to continuously yaw 45 degrees counter-clockwise and then 45 degrees clockwise. By continuously yawing edgewise vibrations cannot build up on the turbine blades to damaging levels. However, as will be appreciated, the nacelle may be instructed to yaw between any suitable angles for the purpose of preventing the buildup of damaging edgewise vibrations on the turbine blades.

If, in step 204, the controller determines that the nacelle is unable to yaw, for example, servicing or maintenance operations are being carried out on the wind turbine then, in step 206, the controller initiates, as a corrective action, the pitch control system to continuously pitch at low speed one or more of the turbine blades in order to prevent damaging levels of edgewise vibrations on the turbine blades.

For example, if a servicing operation is being performed on one of the turbine blades then usually the blade being serviced is kept pointing downwards and it is not possible to yaw the nacelle. The controller may instruct the remaining two turbine blades (in a three turbine blade arrangement) to continuously pitch at low speed so that edgewise vibrations cannot be built up to damaging levels on the blades.

In another example, if a servicing or maintenance operation is being performed in the nacelle or other equipment in the nacelle, e.g. a gear box exchange, then again it is not possible to yaw the nacelle into an upwind position. In this case, the controller instructs the pitch control system to continuously pitch at low speed all three turbine blades so that edgewise vibrations cannot be built up to damaging levels for the blades.

In the above examples of the pitch control system continuously pitching one or more of the turbine blades, the blades may be continuously pitched at low speed from 90 degrees to 70 degrees. However, as will be appreciated, the one or more turbine blades may be instructed to pitch between any suitable angles for the purpose of preventing the build-up of damaging edgewise vibrations on the turbine blades.

Furthermore, the one or more blades may be pitched collectively or independently. Also, the one or more turbine blades may be instructed to change pitch angle in a synchronized manner (e.g. the turbine blades move between 90 degrees and 70 degrees simultaneously) or the one or more turbine blades may be instructed to change pitch angle in an out of synchronized manner (e.g. one turbine blade moves between 90 degrees and 70 degrees and another turbine blades moves between 70 degrees and 90 degree simultaneously).

Accordingly, in the above described embodiments the edgewise vibrations can be reduced or prevented from building up to damaging levels on the turbine blades in circumstances or operational conditions where the wind turbine is unable to yaw into an upwind position.

In circumstances where the wind turbine is able to yaw the nacelle of the wind turbine then the controller may take a corrective action to initiate a continuous low speed yaw of the wind turbine. In circumstances where the wind turbine is unable to yaw then the controller may take a corrective action to initiate a continuous low speed pitching of one or more of the turbine blades. In both circumstances the corrective actions advantageously reduce, limit or prevent edgewise vibrations from building up on the turbine blades which can be very damaging to the turbine blades.

While embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

What is claimed is:

1. A method for controlling a wind turbine comprising a nacelle and one or more turbine blades, wherein the method comprises:
   identifying whether said nacelle is unable to yaw to an upwind position; and
   initiating a corrective action to prevent edgewise vibrations building up on said one or more turbine blades when said nacelle is unable to yaw to the upwind position, wherein said corrective action is based on a determination of whether the nacelle can or cannot yaw, and wherein:
      upon determining that the nacelle can yaw, initiating the corrective action comprises instructing said nacelle to continuously yaw; and
      upon determining that the nacelle cannot yaw, initiating the corrective action comprises instructing at least one of the one or more turbine blades to continuously change pitch.

2. The method as claimed in claim 1 wherein instructing said nacelle to continuously yaw further comprises:
   instructing said nacelle to yaw 45 degrees counter-clockwise and then to yaw 45 degrees clockwise.

3. The method as claimed in claim 2 wherein instructing said at least one of the one or more turbine blades to continuously change pitch angle further comprises:
   instructing said at least one of the one or more turbine blades to change pitch angle between 90 degrees and 70 degrees.

4. A wind turbine comprising:
   a nacelle;
   one or more turbine blades;
   a first processor operable to identify whether said nacelle is unable to yaw to an upwind position;
   a second processor operable to initiate a corrective action to prevent edgewise vibrations building up on said one or more turbine blades when said nacelle is unable to yaw to the upwind position; and
   a third processor operable to determine whether said nacelle can or cannot yaw;
   wherein, when the third processor determines that the nacelle can yaw, initiating the corrective action comprises instructing said nacelle to continuously yaw and
   wherein, when the third processor determines that the nacelle cannot yaw, initiating the corrective action comprises instructing at least one of the one or more turbine blades to continuously change pitch angle.

5. The wind turbine as claimed in claim 4 wherein said second processor is further operable to instruct said nacelle to yaw 45 degrees counter-clockwise and then to yaw 45 degrees clockwise.

6. The wind turbine as claimed in claim 4 wherein said second processor is further operable to instruct said at least one of the one or more turbine blades to change pitch angle between 90 degrees and 70 degrees.

7. A computer program product comprising a non-transitory medium with computer readable executable code which, when executed by one or more computer processors, performs an operation comprising:
   identifying whether a nacelle of a wind turbine is unable to yaw to an upwind position; and initiating a corrective action to prevent edgewise vibrations building up on one or more turbine blades of the wind turbine when said nacelle is unable to yaw to the upwind position, wherein said corrective action is based on a determination of whether the nacelle can or cannot yaw, and wherein:
  upon determining that the nacelle can yaw, initiating the corrective action comprises instructing said nacelle to continuously yaw; and
  upon determining that the nacelle cannot yaw, initiating the corrective action comprises instructing at least one of the one or more turbine blades to continuously change pitch.

8. The computer program product of claim 7, wherein instructing said nacelle to continuously yaw further comprises:
  instructing said nacelle to yaw 45 degrees counter-clockwise and then to yaw 45 degrees clockwise.

9. The computer program product of claim 7, wherein instructing said at least one of the one or more turbine blades to continuously change pitch angle further comprises:
  instructing said at least one of the one or more turbine blades to change pitch angle between 90 degrees and 70 degrees.

* * * * *